UNITED STATES PATENT OFFICE.

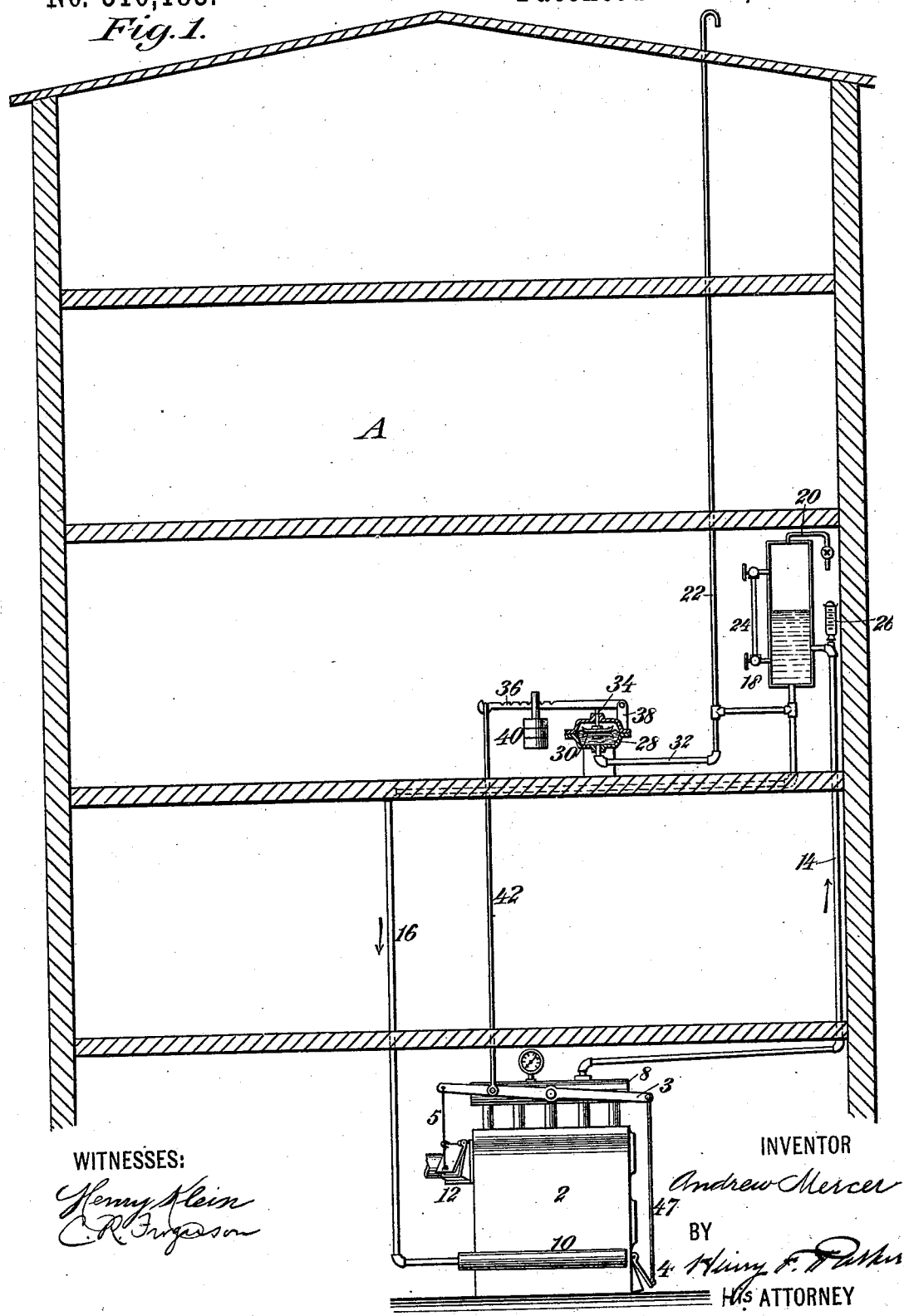

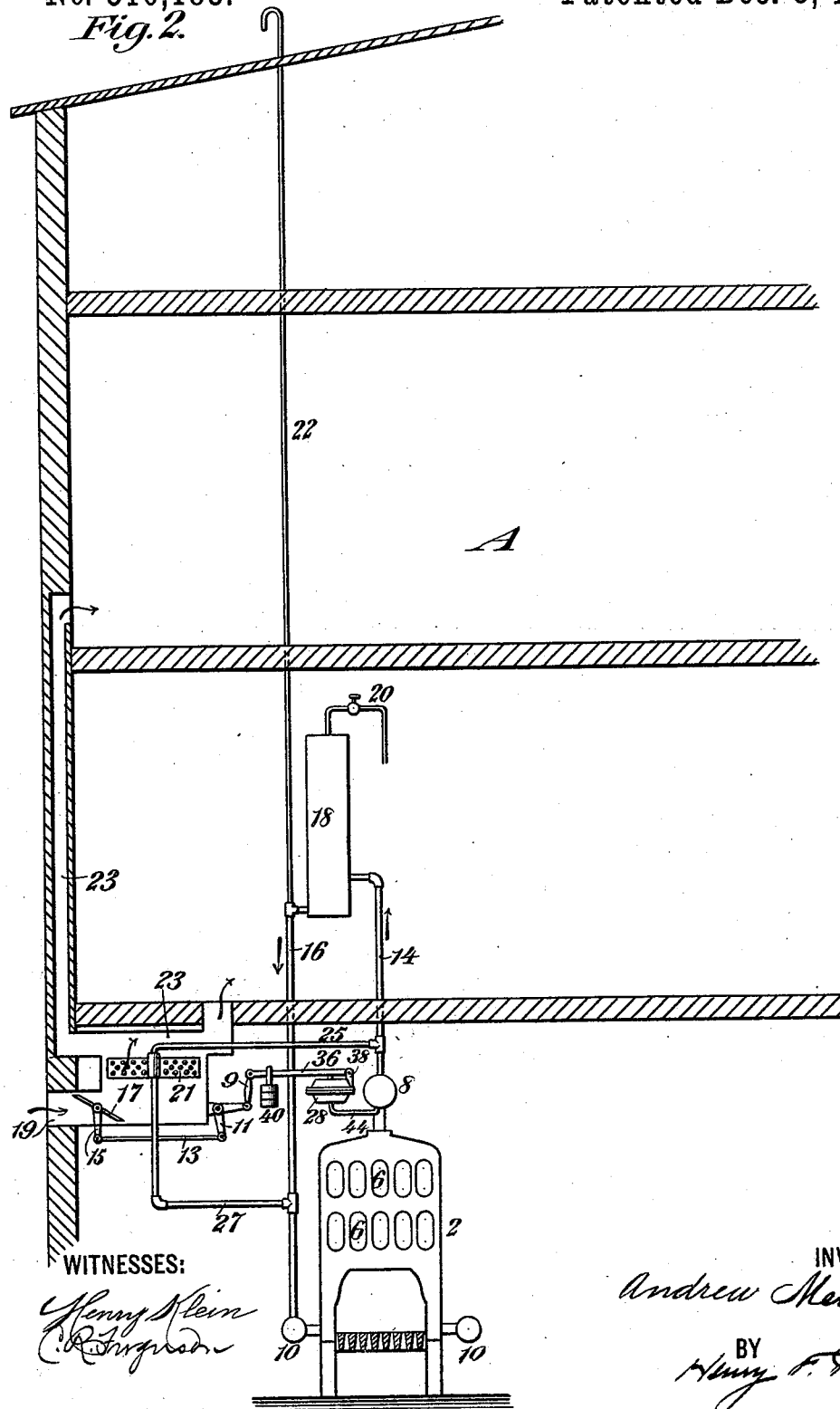

ANDREW MERCER, OF BROOKLYN, NEW YORK.

APPARATUS FOR REGULATING THE TEMPERATURE OF HOT-WATER-HEATING SYSTEMS.

SPECIFICATION forming part of Letters Patent No. 510,183, dated December 5, 1893.

Application filed March 1, 1893. Serial No. 464,174. (No model.)

*To all whom it may concern:*

Be it known that I, ANDREW MERCER, of Brooklyn, county of Kings, and State of New York, have invented a certain new and useful Improvement in Apparatus for Regulating the Temperature of Hot-Water-Heating Systems, of which the following is a specification.

My invention relates to means for heating buildings by hot water circulation, and the objects of said invention are, first, to attain a high temperature consistently with low pressure, thereby obtaining the advantages of steam heating systems, together with economy of construction; and, second, to automatically regulate the temperature of the water at any desired range from, say, 140° to 225° or higher.

My invention consists in controlling the supply of an element of combustion, for instance the air draft of the furnace, by means of the variations in pressure of a hydrostatic column, determined by the volume of a body of liquid subjected to the temperature of the fire; and my said invention further consists in certain improved apparatus, hereinafter described and pointed out in the appended claims.

The invention may be found useful in various applications. I herein illustrate the same in its application to heating buildings.

The advantage of the invention in its particular application herein described, consists in that the high temperature attained in low pressure steam heating systems may be also attained in the use of hot water heating systems at much less cost of apparatus, and with greater accuracy and safety, on account of the comparatively low pressure under which my improved water heating system can be worked at a given high temperature.

In order to enable others skilled in the art to which my invention appertains, to understand and use the same, I will proceed to describe suitable details of construction for carrying it into practice, explain its operation, and subsequently point out in the appended claims its novel characteristics.

I have not deemed it necessary to illustrate a system of circulating or radiator pipes, as they may be of the ordinary construction and connected with the heating apparatus in any well known manner.

In the accompanying drawings: Figure 1, is a sectional elevation of a building showing in elevation a regulating apparatus embodying my improvement. Fig. 2, is a modification showing the application of the apparatus to an air supply regulator, or damper, where hot air circulation is employed.

Referring by reference characters to the drawings, 2, designates the furnace and water circulating apparatus. This furnace and water circulating apparatus may be of any approved construction. It comprises an ash-pit having a door, 4; the circulating water chambers 6; the hot water drum 8, having suitable connections with the circulating chambers, and the return water drums 10, communicating with the lower portions of the circulating chambers. A check draft damper 12, is connected with the smoke flue, and opens to the atmosphere. The ash-pit door 4, also serves as a damper, and both dampers are alternately opened or closed to regulate or control the supply of an element of combustion to the furnace by means now to be described.

14 and 16 designate water circulating pipes communicating with the hot water drum 8, and one or both of the water return drums 10. The pipe 14, is an uptake and leads from the hot water drum 8, and the pipe 16 is a downtake leading into the return water drum 10. At the upper ends the pipes 14 and 16 communicate with an expansion tank 18, so that the pipe 14, the expansion tank 18, and the pipe 16, constitute in effect a single or continuous conduit from the drum 8, to the drum 10.

The space between the water surface and the top wall of the closed expansion tank 18, provides an air chamber, and the air stored therein forms a cushion for the water pressure. A valve controlled vent tube 20, extends from the top of the expansion tank.

22, is the hydrostatic pressure pipe herein shown as connected to the pipe 16, below the expansion tank 18, and extended upward through the roof of the building A. The pipe has an unobstructed passage throughout its length, and in addition to its service for hydrostatic pressure it may serve as a relief outlet should the water under undue expansion reach the outlet thereof. This undue expansion, however, could never occur when all the parts are unobstructed, or in a working condition.

The expansion tank 18, is designed to be placed in any convenient part of a building, provided it is located at a point above the highest radiator or coil in a heating system. For convenience in ascertaining the temperature and height of water in the expansion tank 18, I may attach a water gage 24 thereto, and a thermometer 26 to the pipe 14, or to any other convenient place.

28, designates a casing within which is arranged a movable part herein shown as a flexible diaphragm 30, dividing the interior of the casing into chambers, the lower one of which communicates, in this example of my improvement, with the hydrostatic pressure pipe 22, through a pipe 32. A stem 34, extends from the diaphragm 30, through a wall of the casing 28, and has a connection with the lever 36, fulcrumed to a fixed part, which may be a bracket 38, extending from the casing 28. An adjustable counterbalance 40, is arranged on the lever 36, and by adjusting this counterbalance the pressure required to deflect the diaphragm may be regulated to any required standard. From one end of the lever 36, a connection 42, extends to a fulcrumed damper lever 3, having a connection 5, at one end with the check-draft damper 12, and from the outer end of the lever 3, a connection 47, extends to the draft-damper or ash-pit door 4.

Referring now to the example shown in Fig. 2, in which the variation in a hydrostatic pressure is employed to regulate a supply of outer or cold air to a heater, the lower chamber of the casing 28, is connected directly with the drum 8, through a pipe 44, and the lever 36, has a link connection 9, with one arm of a bell-crank lever 11. From the other arm of the bell-crank lever 11, a link 13, extends to an arm 15, connected to the shaft of a butterfly valve or damper 17, in the air supply conduit 19. 21, designates a stack of radiators arranged within the chamber, providing communication between the supply conduit 19, and the hot air flues 23. The heating medium is circulated through the radiator stack by means of the pipe 25, leading from the uptake 14, and the pipe 27, leading from the stack to the downtake 16.

The expansion tank is of sufficient size to allow for the increase in volume of the water due to a rising temperature prior to the operation of the hydrostatic column. By the combination of air and water in the tank, the rising of the water temperature will increase its volume in the tank, and by the resistance of the confined air force the water up the hydrostatic pressure pipe, which is preferably of smaller internal diameter than the pipes 14, 16, and this hydrostatic pressure operating to deflect the diaphragm 30, will raise the lever 36, and consequently rock the lever 3, to close the ash-pit door 4, and open the check-draft 12. Conversely, a diminished combustion and a lowering of the water temperature will cause the water to fall in the pipe 22, and reduce the pressure on the diaphragm and allow the weight 40, to operate the lever 36, and through it rock the lever 3, to close the check-draft damper 12, and open the ash-pit door 4. If a higher degree of temperature is desired, the weight 40, may be moved outward on the lever 36 which will cause the requirement of a greater expansion into the pipe 22, to actuate the damper. This result may also be accomplished by allowing a portion of the air to escape from the tank 18, through the vent tube 20. It will be seen therefore, that the degree of temperature may be predetermined by means of the valve controlled vent tube. For instance when a higher degree of temperature is desired the liquid may be allowed to rise in the tank 18, to the limit allowed by the compression of the confined air, and then by allowing the escape of a portion of the air the liquid will rise higher in the tank before being checked by the reduced air pressure.

In the example shown in Fig. 2, the operation is practically the same as that above described, and it is to be understood that in this example connections may be made between the lever 36, and draft doors of the furnace similar to the connections first described. In this example the increase in the hydrostatic column deflecting the diaphragm 30 will cause the opening of the valve 17 for the admission of outer air. Upon the fall of the hydrostatic column the weighted lever 36 will operate the parts to close the valve.

An important advantage of the invention consists, in that rapidity of circulation of the water through the heating pipes is promoted, owing to the high temperature acquired consistently with low pressure. The working pressure of the apparatus as regulated herein, is only sufficient to prevent the water boiling at the temperature chosen to be employed.

By locating the regulator in a part of the building readily accessible to the occupant, he may pre-determine the temperature at pleasure by the adjustment of the weight 40. The regulator may obviously be placed in the basement near or upon the heating apparatus 2.

The term "draft mechanism" is herein intended to include means for regulating the supply of air for other purposes than feeding the fire in a system of heating buildings or chambers, such for instance as the damper 17, in Fig. 2.

Having now described my invention, what I claim is—

1. The combination with a pressure regulated furnace draft mechanism, of a closed vessel containing liquid communicating with said pressure regulated mechanism and subjected to the temperature of the fire, a closed expansion tank partly containing liquid communicating with said vessel, and a hydrostatic column pipe communicating with the liquid below its level in said tank and extending and opening, above said level, to the atmosphere.

2. The combination with a pressure regulated furnace draft mechanism, of a closed vessel containing liquid communicating with said pressure regulated mechanism and subjected to the temperature of the fire, a closed expansion tank communicating with said vessel, a valve controlled vent tube on said tank, and a hydrostatic column pipe communicating with liquid below its level in said tank and extending and opening, above said level, to the atmosphere.

3. The combination with a draft mechanism, of a water circulating system having a closed expansion tank, a valve controlled vent tube for said tank, a hydrostatic column pipe communicating with the circulating liquid below its level in said tank, a variably weighted movable part operated by said hydrostatic column, and a connection between said movable part and the draft mechanism.

4. The combination with draft mechanism of a furnace and a water circulating means of an uptake leading from said water circulating means, a downtake extending to said water circulating means, a closed expansion tank with which said uptake and downtake communicate and having air stored therein, the hydrostatic pressure pipe connecting with liquid below its level in said expansion tank and a movable part operated by variations of pressure in said pipe and having connection with draft mechanism, substantially as specified.

ANDREW MERCER.

Witnesses:
CLARENCE R. FERGUSON,
HENRY F. PARKER.